United States Patent [19]

Kazakov et al.

[11] 3,931,053

[45] Jan. 6, 1976

[54] CATALYST FOR CONVERSION OF HYDROCARBONS AND METHOD OF PREPARING SAME

[76] Inventors: Evgeny Vasilievich Kazakov, Tovarischesky pereulok, 17, kv. 47, Moscow; Igor Fedorovich Balitsky, ulitsa Parkovaya, 4, kv. 104; Viktor Stanislavovich Sobolevsky, ulitsa Moskovskaya, 2/14, kv. 5, both of Novomoskovsk Tulskoi oblasti; Vladimir Petrovich Semenov, Vadkovsky pereulok, 4/6, kv. 69, Moscow; Galina Nikiforovna Kashirina, ulitsa Komsomolskaya, 7, kv. 88, Novomoskovsk Tulskoi oblasti; Natalya Alexandrovna Kruglikova, ulitsa Chapaeva, 12a, kv. 56, Novomoskovsk Tulskoi oblasti; Viktor Ivanovich Yagodkin, ulitsa Kalinina, 32, kv. 15, Novomoskovsk Tulskoi oblasti; Mikhail Arkadievich Shpolyansky, Bolshaya Gruzinskaya ulitsa, 14, kv. 86, Moscow; Sergei Ivanovich Ruzinsky, poselok 25 let Khimkombinata, ulitsa Azotchikov, 4, kv. 1, Novomoskovsk Tulskoi oblasti; Igor Dmitrievich Gorbachevich, poselok Syrovo, ulitsa Dachnaya, 17, kv. 1; Ivan Emanuilovich Gergert, prospekt Lenina, 76/2, kv. 44, Podolsk Moskovskoi oblasti, all of U.S.S.R.

[22] Filed: Apr. 18, 1974

[21] Appl. No.: 462,087

[52] U.S. Cl. .......................................... 252/466 J
[51] Int. Cl.$^2$ ..................... B01J 21/04; B01J 23/78
[58] Field of Search.... 252/466 J; 48/214 R, 214 A; 106/62

[56] References Cited

UNITED STATES PATENTS

| | | | |
|---|---|---|---|
| 3,533,963 | 10/1970 | Senes et al. ....................... | 252/466 J |
| 3,549,556 | 12/1970 | Dienes ............................. | 252/466 J |
| 3,839,223 | 10/1974 | Schwab et al. .................... | 252/466 J |
| 3,840,356 | 10/1974 | Bernusset et al. ................. | 252/466 J |

*Primary Examiner*—W. J. Shine
*Attorney, Agent, or Firm*—Waters, Schwartz & Nissen

[57] ABSTRACT

According to the invention, the catalyst contains oxides of nickel (25 per cent by weight), of aluminium (50 per cent by weight), of magnesium (14 per cent by weight), of calcium (10 per cent by weight) and of barium (1 per cent by weight), and the method of preparing it consists in that nickel carbonate, oxide or hydroxide of aluminium, and magnesium oxide precalcined at a temperature of 1300°±50°C, are mixed with an aqueous solution of nickel nitrate and of barium oxide; the obtained mixture is dried and calcined, and to the obtained mixture of the metal oxides are added a binding agent (calcium aluminate), a lubricating agent (potassium stearate), and a wetting agent (water or an aqueous solution of sulphosalicylic acid or of triethanolamine); the prepared mixture is pressed into tablets and the latter are hardened hydraulically, dried and calcined.

The invention can be used in petrochemical synthesis.

10 Claims, No Drawings

CATALYST FOR CONVERSION OF HYDROCARBONS AND METHOD OF PREPARING SAME

This invention relates to catalyst for hydrocarbon conversion, and more particularly for conversion of natural gas with steam or carbon dioxide gas.

Conversion of hydrocarbons with steam, oxygen or carbon dioxide gas is widely used for producing hydrogen, process gases for synthesis of ammonia, methanol and other alcohols in chemical, petrochemical, iron-and-steel, and other industries.

The interaction of gaseous hydrocarbons with steam, carbon dioxide or oxygen is effected in the presence of catalysts, most popular of which are nickel-base catalysts. Reactions of hydrocarbon conversion proceed as a rule at temperatures ranging from 400° to 1100°C, at pressures from 0 to 50 kg/sq.cm; under these conditions hydrocarbons are decomposed into hydrogen, carbon monoxide and carbon dioxide gas.

Catalysts used for hydrocarbon conversion should be highly active, have high mechanical strength, stable to sharp fluctuations of temperature and thermally stable.

Since the active component of the catalyst in the working state is metallic nickel, it is important that the catalysts of hydrocarbon conversion should be capable of reducing nickel oxides to metallic nickel during establishment of the temperature conditions of the process, that is, to display its activity immediately on the attainment of the working temperature, without preliminary reduction of the catalyst.

It is important that the catalyst should not shrink during the process, since otherwise the apparatus should be stopped to replenish the deficient volume of the catalyst.

The catalyst should possess highly developed surface and porosity to decrease hydraulic resistance of the catalyst bed to the flow of the gaseous reaction mixture.

Known catalysts for hydrocarbon conversion that are used in processes at pressures close to atmospheric, contain acid components, silicon dioxide in particular. These compounds make part of the binding agent, which actually are various alumosilicates, for example, kaolin, various natural clays. The introduction of a binding agent into the catalyst ensures high strength of the catalyst tablets on account of cohesion forces inherent in finely dispersed plastic particles of the catalyst mixture.

In modern high-pressure processes of hydrocarbon conversion with steam, the use of silicon-containing catalyst is undesirable, since at increased pressures silica becomes volatile and is entrapped in the steam flow; as a result the silicon content of the catalyst decreases with time, while silica is transferred by the gaseous reaction mixture to the zones with lower temperatures, for example into heat exchangers or economizers, where gel-like silica is precipitated on the working surfaces to interfere with their normal operation.

Therefore, in modern processes of conversion of hydrocarbons with highly efficient apparatus working at pressures from 30 to 50 atmospheres, (for example, in the manufacture of ammonia) use should be made of catalysts that contain no silicon compounds.

The conversion of hydrocarbons with steam is an endothermic process. Heat required to ensure the conversion of hydrocarbon is supplied through the walls of a tubular reactor filled with the catalyst, the heat being obtained from combustion of hydrocarbon gases in burners arranged in the lining of the tubular furnace.

High efficiency of the apparatus for conversion of hydrocarbons can be ensured with uniform withdrawal of heat from the walls of the tubular reactor by the gaseous mixture, which in turn is ensured by stable hydrodynamic conditions inside the tubes filled with the catalyst. The stable hydrodynamic conditions inside the tubes depend on the mechanical and thermal stability of the catalyst, since destruction of the catalyst during the process results in clogging the tubes and in growing hydraulic resistance which involves local superheating of the tube surfaces.

Most of the known catalysts that are now used for conversion of hydrocarbons with steam in tubular furnaces working at increased pressures, are prepared on the basis of nickel with the use of a binding agent, namely calcium aluminates, and a filler material - oxides of magnesium, aluminium, calcium, zirconium, and other refractory oxides.

The filler components produce their effect on both the activity of the catalyst, and also on its physico-mechanical properties, such as strength, density, porosity and refractoriness.

The best in this respect are nickel-base catalysts in which nickel is uniformly distributed throughout the volume of the tablet prepared from the mass obtained by mixing nickel oxide and oxides of other metals with a binding component, and other additives. Such catalysts practically contain no silicon.

The decreased silicon content of the catalyst reduces the strength of the tablets. Known are various compositions of catalysts on the basis of nickel, in which the strength of the catalyst tablets is increased by adding various binding components, strengthening additives, etc.

Known in the prior art is a catalyst, containing 25–30 per cent of nickel, a binding component, namely hydrolytic cement consisting of Portland cement and calcium aluminate. This binder, in combination with a solution of slaked or quick lime produces a cementing action on the catalyst tablets.

Also known is another catalyst containing 5–50 per cent of NiO and to 0.5 per cent of chromate or bichromate of an alkali metal. The binder in this catalyst is aluminous cement containing low quantities of silicon. Mechanical strength of the catalyst tablets is ensured by impregnating them with an aqueous solution of chromate of dichromate of an alkali metal.

Another known catalyst of hydrocarbon conversion contains 10–25 per cent of nickel, 55–85 per cent of alumina and less than 10 per cent of oxides of magnesium and calcium. In this catalyst anhydrous aluminium oxide is the carrier and calcium aluminate is the binder.

The main disadvantages of the known catalysts are their low mechanical strength, the presence of harmful admixture of silica, and complexity of the processes by which they are produced. Impregnation of the catalyst tablets with solutions of chromate or dichromate of alkali metals does not give the required mechanical strength to the catalyst tablets. Possessing sufficient mechanical strength at the beginning of the process, the tablets very soon lose their strength, especially at increased pressures. High alumina content of the catalyst mixture results in premature wear of tabletting machines.

Moreover, the presence of Portland cement in the abovedescribed known catalysts makes them inapplicable for use in modern high-pressure and efficient catalytic processes, since Portalnd cement contains many harmful admixtures such as sulphides.

These disadvantages are inherent also in other known catalysts on the basis of nickel, for example in the known catalyst proposed for producing synthesis gas by steam conversion of gaseous hydrocarbons that contains (in per cent by weight)

| | |
|---|---|
| NiO | 25.2 |
| CaO | 9.2 |
| $Al_2O_3$ | 39.8 |
| $ZrO_2$ | 12.0 |
| MgO | 13.6 |
| $SiO_2$ | 0.2 |

Another catalyst for producing synthesis gas by conversion of various hydrocarbons has the following composition (in per cent by weight)

| | |
|---|---|
| NiO | 25.0 |
| $Al_2O_3$ | 32.6 |
| MgO | 12.2 |
| CaO | 7.5 |
| $SiO_2$ | 12.9 |
| $K_2O$ | 9.8 |

The proportion of silica in the catalyst is very high, while the presence of potassium oxide weakens the structural strength of the catalyst.

Known is a catalyst that contains large quantities of oxides of silicon. It is intended for conversion of gaseous hydrocarbons with oxygen-containing gases, and has the following composition, in per cent:

| | |
|---|---|
| nickel | 14–20 |
| calcium aluminate | 20–35 |
| alumosilicate (clay) | 3–6 |
| aluminium oxide | 39–63 |

Alumina and clay are filler materials, while calcium aluminate is a binder.

The catalyst contains much silica.

Best catalysts known in the prior art for conversion of hydrocarbons and practically containing no silica are those specified in Table 1.

Table 1

| Nos. | Composition (% w/w) | | | | | | | Loss on calcining |
|---|---|---|---|---|---|---|---|---|
| | NiO | $Al_2O_3$ | CaO | MgO | $SiO_2$ | $Fe_2O_3$ | $Cr_2O_3$ | |
| 1 | 23.2 | 45.1 | 11.5 | 3.0 | traces | — | — | 16.4 |
| 2 | 33.8 | 37.0 | 7.9 | 5.8 | 0.4 | 3.6 | 3.4 | 7.9 |
| 3 | 27.1 | 42.6 | 17.9 | traces | — | — | — | 12.4 |

These catalysts, intended for conversion of hydrocarbons at high pressures, possess high activity, that can meet the requirements of a high-rate passage of the starting material (to 2000 cu.m/hour, calculating with reference to methane per cubic meter of the catalyst).

The working characteristics of these catalysts are listed in Table 2.

Table 2

| Nos. | Mechanical strength of tablets, kg/sq.cm | | Density, g/cu.cm | | Porosity, total, % | Specific surface, sq.m/g |
|---|---|---|---|---|---|---|
| | Starting | After 150 hours of work | True | Apparent | | |
| 1 | 500 | 130 | 2.92 | 1.78 | 39.0 | 57.5 |
| 2 | 403 | 75 | 3.53 | 1.69 | 52.3 | 49.9 |
| 3 | 560 | 80 | 3.01 | 1.96 | 34.9 | 86.1 |

As can be seen from Table 2, the catalyst tablets lose markedly their mechanical strength after 150 hours of work under a pressure of 30 atmospheres during steam conversion of natural gas.

The loss of mechanical strength at high pressures is characteristic of all catalysts working under conditions of steam conversion of hydrocarbons, if cements are used as binding agent, and especially if silicon dioxide is practically absent in the catalyst.

It has already been said that the most active are nickel-base catalysts prepared in the form of hollow cylindrical tablets.

Tablets are pressed out of a mass prepared from a mixture of oxides of nickel, aluminium, magnesium, calcium, and other metals and containing a binder, such as cement, calcium aluminate, etc. A wetting liquid, mostly water, and also substances that function as a lubricating agent necessary for the tabletting operation, are added to the mixture. The lubricating agent ensures favourable conditions for the work of pressing equipment, to prevent its working elements from premature wear due to contact with hard and abrasive materials. Graphite is mostly used as the lubricant.

The mixture for tabletting is prepared by mixing salts of nickel, for example, basic nickel carbonate, oxides of aluminium, magnesium and of other metals that function as the filler material, with an aqueous solution of a nickel salt, for example, of nickel nitrate. The prepared mixture is dried at a temperature of 110°–120°C, then calcined at a temperature of 350°–380°C to yield a powder which is a mixture of oxides of nickel, aluminium, magnesium and of other metals. The required mechanical strength is given to the tablets by a binder agent added to the mixture of the metal oxides, the binder being, for example, calcium aluminate, which is also a fine powder. Moreover, added are graphite, to give the mixture elasticity, and finally water, or some other wetting agent, to give plasticity to otherwise dry mixture. Before pressing into tablets, the mixture is compacted and granulated to increase its bulk weight. To this end, the mixture is, for example, passed between rollers, rotating in different directions and through a sieve having apertures of the required size.

The thus pre-treated mixture is pressed into tablets which then are hydraulically hardened by dipping into water for a few hours, with subsequent retention in an atmosphere saturated with steam at room temperature, for a few days. The tablets were then dried and calcined at a temperature of 350°–380°C; during the latter operation the lubricant (graphite) is burnt out. The finished catalyst is packed in metallic containers.

Disadvantages of the catalysts prepared by the above method have been described above.

The objects of this invention is to provide a composition of a catalyst mixture and a simple method for preparing silicon-free catalyst, having high stability, activity, and resistance to sharp temperature fluctuations, well developed surface and high mechanical strength that would persist lengthy periods of the catalyst operation.

Said object has been attained in a catalyst for conversion of hydrocarbons, consisting of the following components, in per cent by weight:

| | |
|---|---|
| NiO | 25.0 |
| $Al_2O_3$ | 50.0 |
| MgO | 14.0 |
| CaO | 10.0 |
| BaO | 1.0 |

Barium oxide is added to the mixture as an aqueous solution, to promote uniform distribution of barium oxide in the catalyst and ensure mechanical strength of the tablets during operation of the catalyst. Barium oxide strengthens the skeletal base of the catalyst tablets thus giving the tablets strength against the action of the gaseous reaction mixture at high temperatures.

Said composition of the catalyst ensures high strength of the catalyst tablets not only in the freshly prepared state, but also after prolonged operation in the hydrocarbon conversion process.

However, the strength of the catalyst tablets does not depend only on the composition of the catalyst, but also on the method of its manufacture.

The above objects have been attained also by that a method of preparing said catalyst has been proposed, consisting in mixing 21.5 parts by weight of basic nickel carbonate, 25 parts by weight of oxide or 38 parts by weight of hydroxide of aluminium, and 15 parts by weight of magnesium oxide, pre-calcined at a temperature of 1300°±50°C, with an aqueous solution of 56 parts by weight of nickel nitrate and an aqueous solution of 1 part by weight of barium oxide; the prepared mixture is dried and calcined at a temperature of 380°C; to the obtained mixture of the oxides of said metals added are a binder component (40 parts by weight of calcium aluminate), and a wetting agent (water or an aqueous solution of sulphosalicylic acid or of triethanolamine); the prepared mixture is compacted, granulated and pressed into tablets; the obtained tablets are hydraulically hardened, dried, and calcined at a temperature of 380°C.

As has already been stated, the introduction into the catalyst composition of barium oxide increases the mechanical strength of the catalyst tablets. This strength persists at a sufficiently high level throughout prolonged operation of the catalyst at high pressures, if magnesium oxide intended for preparing the catalyst is first calcined at temperatures from 1250° to 1350°C. This phenomenon can be explained by that, in contrast to non-calcined magnesium oxide, calcined magnesium oxide loses its ability to form magnesium hydroxide under conditions of the steam conversion of hydrocarbons, while magnesium hydroxides loosen the structural frame of the catalyst tablets. Thus, the use of calcined magnesium oxide also increases the mechanical strength of the catalyst tablets.

To increase mechanical strength of the catalyst tablets, and also its activity, which is manifested by lower temperatures at which the conversion of hydrocarbons begins, according to the invention, potassium stearate is added to the mixture as a lubricating agent. This compound possesses high lubricating property which facilitates the tabletting process, and moreover, it is soluble in water at temperatures from 80° to 90°C. This property is utilized at the stage of hydraulic hardening of the catalyst during which the tablets acquire high mechanical strength. In contrast to some other known lubricating agents, for example graphite, stearic acid, stearates of magnesium, calcium, aluminium and of zinc, oleic acid, polyvinyl alcohol, that possess hydrophobic properties and screen the catalyst pores, potassium stearate is practically fully washed out with water from the catalyst to give free access for water to the catalyst pores during hydraulic hardening of the catalyst tablets and thus ensures full hydration of aluminates of calcium. Full removal of the lubricant from the catalyst during hydraulic hardening and subseqeunt calcining at temperatures of 380°C, ensure free access of the steam-gas mixture (by diffusion) into all pores of the catalyst and make it possible to lower the temperature at which the reaction of hydrocarbon conversion begins to 400°C since the reduction of nickel oxides in the catalyst begins at lower temperatures, and is fully accomplished at 400°c.

The catalyst shows stable performance at temperatures from 400° to 800°C, which cannot be obtained with catalysts, wherein graphite is used as the lubricant, which does not burn out completely at temperatures below 400°C, and stable conditions for the catalyst operation are only established at temperature of 500°C.

One of the reasons why the strength of the catalyst tablets decreases if the catalyst contains cements as the binding agent is dehydration and re-crystallization of calcium aluminate that take place during steam conversion of hydrocarbons at high temperatures, and the changing acidity of the medium. To prevent re-crystallization and dehydration of calcium aluminates, that are responsible for descreased strength of the catalyst tablets during operation, according to the invention it is recommendable to use aqueous solutions of sulphosalicylic acid or of triethanolamine as a wetting agent. The introduction into the composition of the catalyst of weak aqueous solutions of sulphosalicylic acid or of triethanolamine decreases the negative effect of the above-named factors. Aluminium oxide or hydroxide are used as filler materials in preparing the catalyst according to the invention.

It is preferable to use aluminium hydroxide, since the mixture of the catalyst in this case possesses greater plasticity during the tabletting process. The pressing operation proceeds under less stringent conditions, the loads on the working elements are reduced, and the friction forces that arise during the tabletting process are much less significant than with alumina.

The preferable embodiment of the proposed method of preparing catalysts for conversion of hydrocarbons is the one in which according to the invention calcium aluminate is added in two steps, 50 per cent of its total quantity being introduced in the form of calcium dialuminate ($CaO.2Al_2O_3$) during mixing basic nickel carbonate, oxide or hydroxide of aluminium, magnesium oxide with aqueous solutions of nickel nitrate and barium oxide, while the rest 50 per cent are introduced in the form of mono-($CaO.Al_2O_3$) or di-aluminate of calcium during introduction of lubricating and wetting agents to the mixture of metal oxides.

Adding calcium aluminate into the mixture in two portions ensures high stability of the catalyst tablets during operation.

According to the invention, it is recommendable to introduce into the catalyst mixture potassium stearate in the quantity of 0.5–2.0 per cent of the weight of dry catalyst mixture.

Sulphosalicyclic acid, according to the invention, is taken in the quantity of 0.06 – 0.75 per cent of the weight of dry catalyst mixture, and triethanolamine - in the quantity of 0.03–0.45 per cent.

The proposed nickel-base catalyst is a highly effective catalyst for conversion of hydrocarbons that is suitable for operation in tubular furnaces working at pressures to 50 atmospheres and at temperatures of the outer wall of the tube of about 900°C.

The catalyst activity is sufficiently high and ensures practically equilibrated conversion of methane at the volumetric load (with respect to methane) of 2000 c$\mu$.m/hour per cu.m. of catalyst with the ratio of steam to methane of 4.0–4.2, at pressure of 30 atmospheres and at temperatures within the range of 400°–800°C.

The proposed composition of the catalyst mixture and the method of preparing the catalyst make it possible to prepare the catalyst possessing high mechanical strength which in turn ensures intactness of the catalyst tablets throughout the entire process so that they retain their regular geometrical shape of rings with an outer diameter (D) of 15 mm, the inner diameter (d) of 7 mm, and the height of (H) of 12 mm. The tablets are manufactured on automatic rotary tabletting presses.

The catalyst according to the invention is characterized by the following technical characteristics:

1. Bulk weight, kg/liter — 0.9–1.1
2. Mechanical strength (crushing force applied to the butt end of the tablet), kg/sq.cm — 600–900
3. Thermal stability — withstands 20 cycles of sharp heating and cooling at temperatures from 20 to 1000°C and from 1000 to 20°C
4. Density, g/cu.cm — true 3.0–3.15 apparent 2.3–2.5
5. Total porosity, % — 20–30
6. Specific surface, as determined by the low-temperature nitrogen adsorption method, sq.m/g-60–90
7. Activity of the catalyst:- in conversion with steam of hydrocarbon gas containing not less than 90 per cent of methane, not more than 2 per cent of olefines, with volumetric ratio of steam to methane of 2.0–2.2 and the volumetric rate of 2000 cu.m/hour of the said gas per cubic meter of the catalyst, the content of residual methane in the converted gas is not more than (in per cent by volume) at temperatures of
    400°C – 65.0
    500°C – 30.0
    600°C – 9.0
    700°C – 2.0
    800°C – 0.2

This catalyst can successfully work in a tubular furnace, intended for production of ammonia, having the capacity of 400,000 tons of $NH_3$ a year. The pressure in the reaction tubes is 30 atm, the ratio of steam to methane is 4.0–4.2. The shrinkage of the catalyst bed in the tubes does not exceed 1 per cent in 18 months, the tablets retaining their high mechanical strength (not less then 450–500 kg/sq.cm), the percentage of dust or crushed granules being not higher than 3 per cent by weight.

Operation of the proposed catalyst in a tubular furnace ensures uniform distribution of gas flows in the tubes, uniform temperature conditions for outer walls of the tubes, and constancy of the converted gas composition at the outlet from the tubular furnace.

The invention will become better understood from the following description of its possible embodiment.

The catalyst having the composition (in per cent by weight)

| | |
|---|---|
| NiO | 25.0 |
| $Al_2O_3$ | 50.0 |
| MgO | 14.0 |
| CaO | 10.0 |
| BaO | 1.0 | was prepared by mixing together 21.5 parts by weight of basic nickel carbonate, 38 parts by weight of aluminium hydroxide, 15 parts by weight of magnesium oxide, pre-calcined at a temperature of 1300±50°C, and 20 parts by weight of calcium dialuminate. One part by weight of barium oxide was dissolved in 60 liters of an aqueous condensate and then 56 parts by weight of nickel nitrate were dissolved in it. As soon as these components have been dissolved, the solution was poured into a mixer loaded with the above—specified mixture of dry compounds of nickel, aluminium, magnesium, and calcium, and all the components were mixed for two hours. The prepared mixture was dried at a temperature of 100°–120°C for five hours and calcined at a temperature of 380°C until all metal salts were decomposed and nitrous gases stopped evolving.

To the obtained mixture of metal oxides 20 parts by weight of calcium dialuminate, 1 part by weight of potassium stearate and ten liters of an aqueous solution containing 0.12 parts by weight of sulphosalicylic acid were added. The components were mixed for 30 minutes, and the mixture was transferred onto a compacting machine, where it was granulated to that the bulk weight of the material increased to 1.4–1.55 g/cu.cm, the granule size not exceeding 1.5 mm.

The thus prepared granulated mixture was placed in a hopper of a tabletting machine and pressed into tablets by a pressure of 2000-3000 kg/sq.cm. Freshly pressed tablets, having the shapes of rings sizing 15 × 7 × 12 mm ( D × d × H) were kept in air for one day then were hydraulically hardened by immersing into water at room temperature for two hours, after which the temperature of water was raised to 90°C within four hours and the tablets were kept at this temperature for another two hours. Next the tablets were removed from water, dried for five hours at a temperature of 100°–120°C and calcined at a temperature of 380°C for five hours. The finished catalyst was packed in metallic drums and dispatched to consumers.

The advantages of the proposed invention will become apparent from the following examples of its practical embodiment, which are given below by way of illustration.

EXAMPLE 1

A mixer was loaded with 25 kg of finely ground technical alumina, 15 kg of a magnesium oxide calcined at a temperature of 1300°±50°C, and 21.5 kg of basic nickel carbonate $NiCO_3.xNi(OH)_2.yH_2O$. Then 56 kg of nickel nitrate $Ni(NO_3)_2.6H_2O$ were dissolved in 45 liters of water and 1 kg of bariuum oxide was dissolved in 15 liters of hot water. The solutions were poured into the mixer and the components were mixed for two hours to prepare a homogeneous paste. The paste was then dried at a temperature of 100°–120°C and calcined at a temperature of 380°C until the salts were all decomposed and a mixture of metal oxides was formed. (This was indicated by discontinuation of nitrous gas evoltion). To the obtained mixture of metal oxides 40 kg of calcium dialuminate ($CaO.2Al_2O_3$), ten liters of water and 1 kg of potassium stearate were added. The components were mixed for thrity minutes. Then the mixture was compacted on rollers and shaped into granules by rubbing through a metallic sieve having apertures of 1×1 mm. The granulated material sizing from 0.1 to 1.0 mm was charged into a hopper of the tabletting press, on which tablets were prepared in the form of rings sizing 15 × 7 X × 12 mm (D×d×H). The tablets were then kept in air for one day, then placed into water at room temperature for two hours, the temperature was raised within four hours to 90°C and the tablets were kept at this temperature for another two hours. After drying and calcining at a temperature of 380°C the tabletted catalyst was ready for use. The mechanical strength of the thus prepared tablets, and the activity of the catalyst are specified in Table 3.

EXAMPLE 2

A mixer was loaded with 25 kg of finely ground technical alumina, 15 kg of magnesium oxide calcined at a temperature of 1300°±50°C, 21.5 kg of basic nickel carbonate and 20 kg of calcium dialuminate. Then 1 kg of barium oxide and 56 kg of nickel nitrate were dissolved in 60 liters of water and the solution was added to the charge in the mixer. The components were mixed for two hours, the mass was dried and calcined at a temperature of 380°C until the salts were all decomposed and oxides of the said metals were formed.

To the obtained mixture of the metal oxides added were 20 kg of calcium dialuminate, 10 liters of water and 1 kg of potassium stearate. The components were mixed for thirty minutes, then the mass was compacted, granulated, and tabletted into rings sizing 15×7×12 mm.

Further treatment was similar to that described in Example 1. The characteristics of the catalyst are given in Table 3.

EXAMPLE 3

A mixer was loaded with 38 kg of aluminium hydroxide $Al(OH)_3$, 15 kg of magnesium oxide calcined at a temperature of 1300°±50°C, and 21.5 kg of basic nickel carbonate. Then, 56 kg of nickel nitrate were dissolved in 45 liters of water and 1 kg of barium oxide in 15 liters of hot water. The prepared solutions were transferred into the mixer and the components were mixed for two hours. The obtained mass was dried and calcined at a temperature of 380°C until the salts were all decomposed and a mixture of oxides was fomed. To the obtained mixture of the oxides added were 40 kg of calcium dialuminate, 10 liters of water and 1 kg of potassium stearate and the components were mixed for thirty minutes.

The further procedure was the same as in Example 1. The characteristics of the catalyst are given in Table 3.

EXAMPLE 4

A mixer was loaded with 38 kg of aluminium hydroxide, 15 kg of magnesium oxides calcined at 1300°±50°C, 21.5 kg of basic nickel carbonate, and 20 kg of calcium dialuminate. Next, 1 kg of barium oxide was dissolved in 60 liters of water and then 56 kg of nickel nitrate were dissolved in the same solution. The whole quantity was transferred into the mixer. The components were mixed for two hours, and the mass dried and calcined at a temperature of 380°C until the salts were all decomposed and the metal oxides formed.

To the obtained mixture of the oxides added were 20 kg of calcium dialuminate, 10 liters of water, and 1 kg of potassium stearate. The components were mixed for thrity minutes.

Further procedure was the same as described in Example 1.

The characteristics of the catalyst are given in Table 3.

EXAMPLE 5

A mixer was loaded with 38 kg of aluminium hydroxide, 15 kg of magnesium oxide pre-calcined at a temperature of 1300°±50°C, 21.5 kg of basic nickel carbonate and 20 kg of calcium dialuminate. Then, first, 1 kg of barium oxide and then 56 kg of nickel nitrate were dissolved in 60 liters of water and the solution was added to the mixer. The components were mixed for two hours, the mass was dried, and finally calcined at a temperature of 380°C until the salts were all decomposed and the mixture of the metal oxides was formed.

To the obtained mixture of the oxides added were 20 kg of calcium monoaluminate, ten liters of water and 1 kg of potassium stearate, and the components were mixed for thirty minutes.

Further procedure was the same as described in Example 1.

The characteristics of the catalyst are given in Table 3.

EXAMPLE 6

The catalyst was prepared by a procedure similar to that described in Example 4, except that potassium stearate was taken in the quantity of 0.5 kg.

The characteristics of the catalyst are given in Table 3.

EXAMPLE 7

The catalyst was prepared by a procedure similar to that described in Example 4, except that potassium stearate was taken in the quantity of 2 kg.

Characteristics of the catalyst are given in Table 3.

EXAMPLE 8

The catalyst was prepared by a procedure similar to that described in Example 4, except that the wetting agent was 10 liters of an aqueous solution containing 60 g of sulphosalicylic acid.

The characteristics of the catalyst are given in Table 3.

EXAMPLE 9

The catalyst was prepared by a procedure similar to that described in Example 4, except that the wetting agent was 10 liters of an aqueous solution, containing 120 g of sulphosalicylic acid.

The characteristics of the catalyst are given in Table 3.

EXAMPLE 10

The catalyst was prepared by a procedure similar to that described in Example 4, except that the wetting agent was 10 liters of an aqueous solution, containing 750 g of sulphosalicyclic acid.

The characteristics of the catalyst are given in Table 3.

EXAMPLE 11

The catalyst was prepared by a procedure similar to that described in Example 4, except that the wetting agent was 10 liters of an aqueous solution containing 30 g of triethanolamine.

The characteristics of the catalyst are given in Table 3.

EXAMPLE 12

The catalyst was prepared by a procedure similar to that described in Example 4, except that the wetting agent was 10 liters of an aqueous solution, containing 150 g of triethanolamine.

The characteristics of the catalyst are given in Table 3.

EXAMPLE 13

The catalyst was prepared by a procedure similar to that described in Example 4, except that the wetting agent was 10 liters of an aqueous solution, containing 450 g of triethanolamine.

The charateristics of the catalyst are given in Table 3.

Table 3

| Example No. | Mechanical strength of catalyst tablets, kg/sq. cm | | Residual methane in dry converted gas, in % (v/v), at °C | | |
|---|---|---|---|---|---|
| | Initial | After 150 hours of work | 400°C | 600°C | 800°C |
| 1 | 700 | 330 | | | |
| 2 | 680 | 350 | | | |
| 3 | 670 | 320 | | | |
| 4 | 690 | 360 | | | |
| 5 | 620 | 270 | | | |
| 6 | 800 | 390 | | | |
| 7 | 520 | 230 | 48.5–55.0 | 10.8–12.5 | 0.0–0.2 |
| 8 | 800 | 470 | | | |
| 9 | 830 | 550 | | | |
| 10 | 820 | 490 | | | |
| 11 | 800 | 400 | | | |
| 12 | 780 | 410 | | | |
| 13 | 760 | 400 | | | |

We claim:
1. A catalyst for conversion of hydrocarbons consisting of a mixture of oxides of nickel, aluminium, magnesium, calcium and of barium.
2. A catalyst for conversion of hydrocarbons according to claim 1, having the following composition, in per cent by weight:

| | |
|---|---|
| NiO | 25 |
| $Al_2O_3$ | 50 |
| MgO | 14 |
| CaO | 10 |
| BaO | 1 |

3. A method of preparing a catalyst for conversion of hydrocarbons, containing oxides of nickel, aluminium, magnesium, calcium, and of barium, consisting in that 21.5 parts by weight of basic nickel carbonate, an aluminium compound, selected from the group, consisting of aluminium oxide and aluminium hydroxide, and 15 parts by weight of magnesium oxide, pre-calcined at a temperature of 1300°±50°C, are mixed with an aqueous solution containing 56 parts by weight of nickel nitrate and an aqueous solution, containing 1 part by weight of barium oxide; the prepared mixture is dried, and calcined at a temperature of 380°C; to the obtained mixture of the metal oxides are added a binding agent, a lubricating agent and a wetting agent, selected from the group, consisting of water, an aqueous solution of sulphosalicylic acid and an aqueous solution of triethanolamine; the prepared catalyst mixture is compacted, granulated, and tabletted; the obtained tablets are hardened hydraulically, dried, and calcined at a temperature of 380°C.

4. A method of preparing the catalyst for conversion of hydrocarbons, containing oxides of nickel, aluminium, magnesium, calcium, and of barium, consisting in that 21.5 parts by weight of basic nickel carbonate, an aluminium compound, selected from the group, consisting of aluminium oxide taken in the quantity of 25 parts by weight and aluminium hydroxide taken in the quantity of 38 parts by weight, 15 parts by weight of magnesium oxide, pre-calcined at a temperature of 1300°±50°C, a binding agent of calcium dialuminate, taken in the quantity of 50 per cent with respect to the total quantity of the binding agent in the catalyst, are mixed with an aqueous solution, containing 56 parts by weight of nickel nitrate and an aqueous solution, containing 1 part by weight of barium oxide; the prepared mixture is dried and calcined at a temperature of 380°C; to the obtained mixture of the metal oxides are added the other 50 per cent of the binding agent, selected from the group, consisting of calcium monoaluminate and calcium dialuminate, so that the total quantity of the binding agent is 40 parts by weight, a lubricating agent of potassium stearate, and a wetting agent selected from the group, consisting of water, aqueous solution of sulphosalicylic acid, and aqueous solution of triethanolamine; the prepared catalyst mixture is compacted, granulated, and tabletted; the obtained tablets are hardened hydraulically, dried, and calcined at a temperature of 380°C.

5. A method according to claim 3, in which potassium stearate is taken in the quantity of 0.5–2.0 per cent of dry weight of the catalyst mixture.

6. A method according to claim 4, in which potassium stearate is taken in the quantity of 0.5–2.0 per cent of dry weight of the catalyst mixture.

7. A method according to claim 3, in which sulphosalicylic acid is taken in the quantity of 0.06–0.75 per cent of dry weight of the catalyst mixture.

8. A method according to claim 4, in which sulphosalicylic acid is taken in the quantity of 0.06–0.75 per cent of dry weight of the catalyst mixture.

9. A method according to claim 3, in which triethanolamine is taken in the quantity of 0.03–0.45 per cent of dry weight of the catalyst mixture.

10. A method according to claim 4, in which triethanolamine is taken in the quantity of 0.03–0.45 per cent of dry weight of the catalyst mixture.

* * * * *